UNITED STATES PATENT OFFICE.

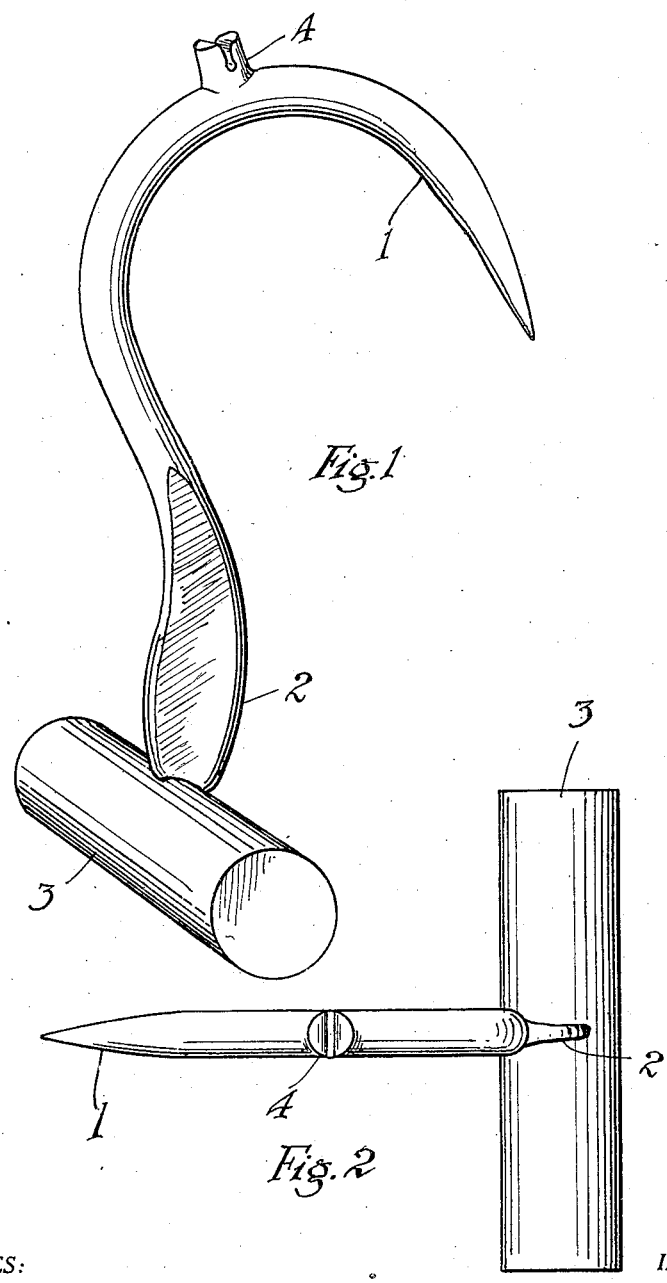

JOHN VASEY, OF EMERYVILLE, CALIFORNIA.

COMBINATION HAY-BALE HOOK AND WIRE CUTTER.

No. 877,619.　　　　Specification of Letters Patent.　　　　Patented Jan. 28, 1908.

Application filed October 4, 1907. Serial No. 395,836.

*To all whom it may concern:*

Be it known that I, JOHN VASEY, a citizen of the United States, residing at Emeryville, in the county of Alameda and State of California, have invented new and useful Improvements in Combination Hay-Bale Hook and Wire Cutters, of which the following is a specification.

The object of the present invention is to provide an instrument which will facilitate the feeding of hay to horses or cattle.

At present it is necessary, first, to move the bale of hay from the place of storage by means of a bale hook, and then to cut the bale wire by means of an ax or other instrument in order to distribute the hay. This operation not only requires the use of an additional tool, but entails a loss of time in making the change from one tool to the other. I have succeeded in devising a single instrument by means of which the bale can be moved to the desired position for feeding to the stock, and the wire can then be cut to unbind the bale.

In the accompanying drawing, Figure 1 is a perspective view of the tool; Fig. 2 is a top plan view thereof.

Referring to the drawing, 1 indicates a bale hook having a shank 2 secured to a handle 3. Extending from the hook in a direction outwards from the handle is a wire cutter 4, having two members each substantially semi-cylindrical, their flat sides being opposed to each other and spaced sufficiently apart to receive therebetween the wire that is to be cut, said flat sides having sharp edges adapted to cut the wire. Said members diverge from each other at their outer ends to form a flaring mouth to receive the wire.

After using the hook to move the bale of hay to the desired position, the operator, immediately after withdrawing the hook, places it so that the wire of the bale passes between the two members of the wire cutter, and then by twisting the hook, preferably in opposite directions in succession, quickly cuts the wire thereby, and the hay can then be distributed as may be desired.

I claim:—

1. A bale hook comprising a stem formed into a hook at one end and provided with a handle at the other end, and a cutter formed thereon consisting of two members extending from said stem outwards or in the direction away from said handle, and formed with opposing sides having sharp edges, substantially as described.

2. A bale hook having a stem and a handle transverse to said stem, and a cutter formed on said hook comprising two members extending from said stem outwards or in the direction away from said handle, and formed with flat inner sides and sharpened edges, substantially as described.

3. A bale hook having a stem and a handle transverse to said stem, and a cutter formed on said hook comprising two members extending from said stem outwards or in the direction away from said handle, and formed with flat inner sides and sharpened edges, and diverging at their outer ends to form a flaring mouth, substantially as described.

In testimony whereof I have hereunto set my hand in the presence of two subscribing witnesses.

JOHN VASEY.

Witnesses:
　FRANCIS M. WRIGHT,
　D. B. RICHARDS.